United States Patent
Roulleaux et al.

(10) Patent No.: US 8,545,615 B2
(45) Date of Patent: Oct. 1, 2013

(54) AQUEOUS FORMULATION FOR AN ANTIFOULING COATING SYSTEM FOR SUBMERGED SUBSTRATES, METHOD FOR TREATING SAME, AND USE THEREOF

(75) Inventors: Veronique Roulleaux, Saint Raphael (FR); Patrick Frangoulis, Bois-Colombes (FR)

(73) Assignee: Seawax Marine Coatings, Saint Raphael (FR)

( * ) Notice: Subject to any disclaimer, the term of this patent is extended or adjusted under 35 U.S.C. 154(b) by 0 days.

(21) Appl. No.: 13/256,325

(22) PCT Filed: Mar. 15, 2010

(86) PCT No.: PCT/FR2010/000213
§ 371 (c)(1),
(2), (4) Date: Sep. 13, 2011

(87) PCT Pub. No.: WO2010/103209
PCT Pub. Date: Sep. 16, 2010

(65) Prior Publication Data
US 2012/0004357 A1   Jan. 5, 2012

(30) Foreign Application Priority Data
Mar. 13, 2009  (FR) ...................................... 09 01175
Jul. 20, 2009  (FR) ...................................... 09 03562

(51) Int. Cl.
*B08B 17/00* (2006.01)
*B32B 27/30* (2006.01)
*B32B 27/40* (2006.01)

(52) U.S. Cl.
USPC .................. 106/270; 106/287.13; 428/423.1; 428/447; 428/450; 428/461; 428/500; 525/100; 525/455

(58) Field of Classification Search
None
See application file for complete search history.

(56) References Cited

U.S. PATENT DOCUMENTS

| 5,298,060 A | 3/1994 | Harakal et al. |
| 6,413,446 B1 | 7/2002 | Mechtel et al. |
| 2005/0215654 A1* | 9/2005 | Wright et al. ..................... 522/6 |
| 2009/0123758 A1 | 5/2009 | Amidaiji et al. |

FOREIGN PATENT DOCUMENTS

| EP | 0563939 A1 | | 10/1993 |
| EP | 1829943 A1 | | 9/2007 |
| JP | 08-081524 | * | 3/1996 |
| JP | 08-081524 A | | 3/1996 |
| WO | WO 96/06907 | * | 3/1996 |

OTHER PUBLICATIONS

Machine-generated translation of WO 96/06907 into English (Mar. 2013).*
Abstract for CN 101349028 A (Jan. 2009).*
Machine-generated translation into the English language of JP 08-081524.*
International Search Report of PCT/FR2010/000213, mailing date Jun. 23, 2010.

* cited by examiner

*Primary Examiner* — Marc Zimmer
(74) *Attorney, Agent, or Firm* — Westerman, Hattori, Daniels & Adrian, LLP (57) ABSTRACT

The invention relates to a formulation for an antifouling coating system to be applied on submerged substrates. The invention is characterized in that the formulation contains at least 30 wt % of water relative to the total weight thereof, at least 10 wt % relative to the total weight thereof of a dry extract of a waterproofing agent selected from a silicone resin, a polyurethane resin, and/or a styrene acrylic copolymer resin either alone or mixed, and at least 5 wt % relative to the total weight thereof of a dry extract of an active anti-adhesion agent. The invention also relates to a method for processing substrates to be submerged using such a formulation, and to the use of such a formulation as an antifouling agent for deterring the attachment of marine organisms such as algae, shellfish and other crustaceans on any submerged substrate, and in particular ship hulls.

21 Claims, 1 Drawing Sheet

AQUEOUS FORMULATION FOR AN ANTIFOULING COATING SYSTEM FOR SUBMERGED SUBSTRATES, METHOD FOR TREATING SAME, AND USE THEREOF

BACKGROUND ART

The invention relates to a formulation for an antifouling coating system for application to submerged substrates, a method for treatment with such a formulation of substrates to be submerged, and the use of such a formulation as an antifouling agent for inhibiting the attachment of marine organisms such as algae, shellfish and other crustaceans in any submerged substrate, and in particular ship hulls.

A submerged substrate is spontaneously colonized by marine organisms. This is a quite normal phenomenon under water, especially in the light-receiving and nutrient-rich layers.

Indeed, the sea which, in a broad sense, is a vast expanse of salt water and, to a lesser extent, freshwater, is naturally rich in proteins and polysaccharides, produced mainly by plankton and the excreta of the multitude of aquatic organisms that can be found in seawater. The surface of the sea or freshwater, when it is not very rough, is thus permanently covered with a biofilm. Below the water's surface, the suspended elements are deposited onto any submerged substrate in the form of a film having a thickness of a few microns, after only a few seconds or minutes in a rich medium. This film provides some types of bacteria, microalgae and aquatic microscopic fungi, known as pioneer organisms, with an initial source of nutrients. These then enrich the film, which thickens into a thicker mucilaginous biofilm, thus becoming a substrate for increasingly complex colonies of protozoa, and then for fixed or mobile organisms (macro-algae, larvae of invertebrates and vertebrates), including encrusting species, which themselves become a substrate for other species. In addition, many marine organism larvae have amazing fixation capabilities, even on living, flexible and highly mobile substrates, as is the case with barnacles on the skin of whales.

Thus, it is known that the final layer of paint or coating, applied for example to the hull of a ship before its launch, should preferably be of the antifouling type. Indeed, this helps protect the submerged part of the hull against the attachment of such marine organisms.

However, most anti-fouling paints and other coatings available on the market, in particular before the introduction of the new environmental standards in force to date, are primarily made from biocides, starting products that are extremely harmful to the environment and humans. They are harmful, on the one hand to the marine or river environment, due to poisoning of fauna and flora, and on the other hand to the person who applies or cleans them.

Thus, these paints could contribute to certain phenomena of dystrophization and overgrowth of undesirable species. The species of phytoplankton and zooplankton that are most sensitive to biocides are disappearing, in favor of unwanted or toxic algae. Some biocides and other pollutants can also accumulate in the biofilm which forms on the surface of calm waters and be "exported" with sprayed water to the coast and inland areas during storms, to such an extent as to affect or even kill the most fragile plants of the coastal strip.

In addition, the immediate risks for the person who handles them are irritating for the lungs, allergic and cutaneous. This is referred to as direct toxicity to humans. Without adequate protection, any user may indeed inhale these particles, for example when using a spray gun, or when sanding the antifouling layer from a hull, or they may pass through the skin after contact with projections or paint, or more rarely via accidental ingestion, or more rarely even by voluntarily ingesting paint chips (for example, with the phenomenon known as "pica"). Such anti-fouling paints can also induce indirect toxicity in humans, through the ingestion of filtering shellfish, such as mussels, oysters, clams, etc. or other seafood or fish that have grown downstream from dry docks (painting or stripping of ship hulls) or close to submerged wrecks. Regular consumption of contaminated seafood is likely to induce acute or chronic diseases associated with heavy metals. Concerning the long-term risks, these are still poorly understood, but could include degenerative diseases, autoimmune diseases, or cancer.

The application of biocide-based antifouling paints must therefore always be carried out using protection for the skin and mucous membranes (dry suits, goggles, gloves) and respiratory protection (cartridge respirator).

In addition, decomposition by burning of most biocide-based antifouling paints, which have a flash point of less than 55° C. and are thus considered flammable, also leads to the release of highly toxic gases, fumes and ashes.

Such biocide-based anti-fouling paints thus contain one or more toxic molecules and are proven to be polluting.

In particular, these include tributyltin (TBT), which is very effective and has been the most widely used biocide in the maritime field throughout the world. However, this product and its degradation molecules and metabolites have turned out to be serious and lasting pollutants, to the point of decimating natural populations of shellfish and disrupting the breeding of many species. In particular, in some organisms TBT induces an imposex phenomenon at very low dilutions, below one ng/L. TBT residues, including tin, which is non-biodegradable, are long-lasting in harbor sediments and at dredged mud dumping sites, and downstream of these, as a consequence of their potential re-suspension. For these reasons, in November 1999, a resolution of the IMA (A.895) was proposed and adopted on Oct. 5, 2001, prohibiting tin-based antifouling paints as of 1 Jan. 2003. Their presence on ships' hulls has been prohibited since 2008.

Also known are other anti-fouling paints from the family of biocides, which prove less toxic, but nevertheless remain so. According to the European Commission project "Assessment of Antifouling Agents in Coastal Environment," the analysis of residues released into the water by these paints reveals the presence of copper, in particular in the form of cuprous oxide, copper dioxide, copper thiocyanate, copper acrylate, copper powder in the form of flakes, copper hydroxide, zinc in the form of zinc pyrithione, copper-nickel, or also rosin (or rosine). Also, among the biocides released into the water, those mostly found were organochlorines such as dichlorophenyl dimethyl urea (diuron), 2-methylthio-4-tert-butylamino-6-cyclopropylamino-s-triazine (Irgarol 105®I) 2,4,5,6-tetra-chloroisophthalonitrile (chlorothalonil), 4,5 dichloro-2-n-octyl-4-isothiazolin-3-one (Seanine 211® Kathon 5287®), and dichlorofluoro methylthiodimethyl phenyl sulfamide (dichlofluanid). Also found, although less often and in smaller quantities, were 2-thiocyanomethylthio benzothiazole (TCMTB), 2,3,5,6-tetrachloro-4-sulfuronyl pyridine (TCMS pyridine), zinc dithio carbamate (zineb), arsenic trioxide. These biocides sometimes become associated with one another and/or copper, achieving synergistic effects, and strengthening or broadening their spectrum of action.

In general, there is a genuine need for products or preparations that are free of any toxic biocide, that are much less harmful to human and animal health, and just as effective. In the present context, particularly. In the context of biocide regulation, it would be desirable to find an antifouling paint or coating, which would be less irritating and less toxic, at least as effective as paints containing biocides, without having the adverse effects of the prior art paints.

Biocide-free antifouling coatings with anti-adhesion properties against the attachment of marine organisms have been tested and developed, based for example on liquid organosilicones, or liquid paraffin or fluorinated oils in combination with polymers of the organopolysilicone type. The mode of action of these coatings is based on the lower surface tension of silicone and on the more or less controlled release of lubrication additives used to prevent the attachment of marine organisms. However, the effectiveness of these antifouling coatings is limited. Another disadvantage is their low mechanical load capacity, which is frequently associated with insufficient adhesion to anti-corrosive coatings, thus requiring the application of an intermediate tie layer.

More particularly, from U.S. Pat. No. 6,413,446 an antifouling agent is known, which comprises in particular carbosiloxanes, alkoxysilanes, an organic solvent and/or water, a catalyst, inorganic nanoparticles as well as lubricant additives. However, this agent appears to comprise only a very small amount of anti-adhesion lubricating agent in addition to silicone resins.

From EP 0 563 939 a formulation is known, which contains a silicone resin, a silicone fluid and a solvent to form an antifouling coating in which the silicone fluid forms a liquid interface on top of the resin layer and prevents the flora and fauna from attaching firmly to the substrate surface. Such an antifouling coating undergoes a phase shift and is not homogeneous.

Also known from EP 1 829 943 is an antifouling coating composed of a composition comprising an organopolysiloxane and paraffin or silicone oil. Paraffin or silicone oil exude at the surface of the film formed by the coating and contribute to the antifouling performance. Such an antifouling coating also undergoes a phase shift and is not homogeneous.

Finally, from JP 08 081 524 an antifouling composition is known, which comprises a silicone resin emulsion and optionally a wax or an oil-based emulsion. However, such compositions do not prove to be stable over time.

SUMMARY OF THE INVENTION

Considering the above, a problem to be solved, by the invention is to implement a new formulation for an antifouling coating system designed to be easily applied to submerged substrates, which is capable of reducing the attachment of marine organisms as effectively as biocide-containing, water-resistant, stable over time and homogeneous, single-phase paints, without the side effects reported in the prior art.

Thus, with a view to meeting this need, the inventors have discovered, unexpectedly, that an aqueous, hydrophobic and oleophobic, single-phase, homogeneous formulation, which is for application to substrates immersed in an aqueous medium, has an outstanding antifouling action for inhibiting the attachment of marine organisms, is waterproof and stable over time, thereby providing a new alternative whilst resecting the environment and human health.

The formulation according to the invention offers the following advantages over the prior art:
 the formulation contains no toxic biocide and does not have the adverse effects of paints containing them;
 the formulation is environmentally friendly;
 the formulation has a flash point of more than 55° C. and is considered to be non-flammable;
 the formulation offers advantages in terms of safety of transportation, storage and use;
 the formulation is in an aqueous-phase and is hydrophobic, oleophobic, and homogeneous with a single phase;
 the formulation can effectively protect the submerged part of any substrate against the attachment of marine organisms and their possible degradation;
 the formulation avoids the introduction of pathogens via marine organisms through the development, of maritime transport;
 the formulation is particularly suitable for application to the hulls of ships in order to reduce weight and water resistance, reduce hydrodynamic drag, increase speed, reduce fuel consumption and reduce the frequency of cleaning;
 the formulation may be applied to a hull coated with an anticorrosive agent;
 the formulation dries rapidly at room temperature; and
 the formulation is easy to clean.

A first object of the present invention is therefore to provide a formulation for an antifouling coating system for application to submerged substrates, characterized in that it comprises at least 30 wt % of water, relative to the total weight, at least 10 wt % of dry extract, relative to the total weight, of a water repellent selected from a silicone resin, a polyurethane resin and/or an acrylic styrene copolymer resin, taken alone or in admixture, and at least 5 wt % of dry extract relative to the total weight, of an active anti-adhesion argent.

In addition, its second object is to provide a method for treating substrates to be submerged with a formulation according to the invention, characterized in that the formulation is applied in the form of at least one layer by spraying, roller or with a brush, to the substrate to be protected against marine fouling, after prior cleaning and drying of the substrate, at an outside temperature of between about 5° and about 50° C., preferably between about 15° and 30° C., and is then dried at room temperature, for example at 23° C., for about 25 minutes to about 40 minutes between two successive layers, and between about 30 minutes and about 50 minutes before launch.

Finally, its third object is to use a formulation according to the invention, as an antifouling agent for inhibiting the attachment of marine organisms such as algae, shellfish and other crustaceans onto any submerged substrate and in particular the hulls of ships.

The invention and advantages derived therefrom will be better understood upon reading the following description and non-limiting embodiments.

DETAILED DESCRIPTION OF PARTICULAR EMBODIMENTS

In this description, unless otherwise specified, it is understood that when a concentration range is given, it includes the upper and lower bounds of that range, and is given by weight relative to the total weight of the formulation.

The formulation of an antifouling coating system according to the invention is intended to be applied to submerged substrates.

Non-limiting examples of submerged substrates include any items or constructions intended to be submerged in a marine environment, such as the hulls of boats or ships, engine-bases, propellers, propeller shafts, floats, pillars of piers or docks, beacon buoys, or also any measurement or image pickup equipment adapted to be submerged.

Also, the formulation according to the invention can be applied to any surface, for example wood, any metal, such as aluminum and iron, any metal alloy such as steel, polyester, glass, earthenware, or even concrete.

The formulation according to the invention comprises at least 30% by weight, relative to the total weight, of water, at least 10% by weight of dry extract, relative to the total weight, of a water repellent selected from a silicone resin, a polyurethane resin and/or an acrylic styrene copolymer resin, taken alone or in admixture, and at least 5% by weight of dry extract relative to the total weight, of an active anti-adhesion agent.

The formulation according to the invention comprises at least 30% of water.

According to one embodiment of the invention, the formulation comprises at least 50% of a solvent-cosolvent system predominantly comprising water.

The solvent-cosolvent system according to the invention comprises at least one compound selected from non-aqueous hydrocarbons, alcohols, ketones, esters, alone or in combination.

According to one embodiment of a formulation according to the invention, the solvent-cosolvent system comprises at least 20% of a compound selected from non-aqueous hydrocarbons, alcohols, ketones, esters, alone or in combination.

Non-limiting examples of hydrocarbons according to the invention include hydrocarbon solvents having from 2 to 24 carbon atoms, paraffinic, isoparaffinic, cycloparaffinic hydrocarbons such as hydrotreated heavy naphtha and aromatics such as xylene, preferably a C8 to C10 naphtha cosolvent and a dearomatized aliphatic hydrocarbon.

Non-limiting examples of alcohols according to the invention include an alcoholic hydrocarbon having from 2 to 20 carbon atoms, preferably ethanol, isopropanol or butanol or also monopropylene glycol. The aqueous solvent-cosolvent system according to the invention is thus hydro-alcoholic.

The solvent-cosolvent system according to the invention advantageously has antifreeze properties, which, in particular, are imparted by monopropylene glycol.

A non-limiting example of ketones according to the invention preferably includes N-methylpyrrolidone.

Non-limiting examples of the ester according to the invention preferably include rapeseed methyl ester, and even more preferably a mixture of methyl oleate and linoleate.

The aqueous solvent-cosolvent system used according to the invention is therefore selected so as to be adapted and appropriate for the production of a homogeneous, single-phase mixture with the water repellent selected from a silicone resin, a polyurethane resin and/or an acrylic styrene copolymer resin taken alone or in admixture, and the active anti-adhesion agent.

According to an embodiment of a formulation according to the invention, the non-aqueous cosolvent is selected from the Class 3 solvents that are non flammable at room temperature and have a flash point of more than 55° C.

A non-limiting example of a Class 3 non-aqueous cosolvent includes N-methylpyrrolidone.

Such a non-aqueous cosolvent used according to the invention is therefore selected so as to be suitable and required to obtain a homogeneous, single-phase mixture with the water repellent selected from a silicone resin, a polyurethane resin and/or an acrylic styrene copolymer resin, and the active anti-adhesion agent by solubilizing them, in order to promote the anti-attachment effect to the submerged substrate and to obtain a formulation having a flash point of more than 55° C.

According to an embodiment of the invention, the formulation comprises a solvent-cosolvent system essentially comprising water, at least 80% by weight of water, relative to the weight of the solvent-cosolvent system.

According an embodiment of the invention, the formulation comprises at least 50% by weight of water, relative to the total weight.

The formulation according to the invention also comprises at least 10% by weight, of dry extract, relative to the total weight, of a water repellent selected from a silicone resin, a polyurethane resin and/or an acrylic styrene copolymer resin, alone or in admixture.

The amount of water repellent selected from a silicone, polyurethane and/or acrylic styrene copolymer resin, alone or in admixture, in particular for the silicone or polyurethane resin, is preferably considered to be in an aqueous or solvent-based phase. The formulation according to the invention may comprise less than 10% of the water repellent comprising a silicone resin or a polyurethane resin or an acrylic styrene copolymer resin, considered independently from each other, by weight of dry extract relative to the total weight, the mixture of two types of resin or three types of resin representing at least 10% by weight of dry extract relative to the total weight of the formulation.

The silicone resin-based water repellent according to the invention is a siloxane or polysiloxane resin and/or their derivatives, alone or in combination, in an aqueous or solvent-based, preferably an aqueous, non-ionic phase.

Non-limiting examples of a silicone resin according to the invention preferably include the polymethylsiloxane or polydimethylsiloxane resin, in an aqueous or solvent-based phase.

The hydrophobic water repellent comprising silicone, polyurethane and/or styrene copolymer acrylic resin according to the invention is selected so as to enable cohesion of the antifouling coating film onto its substrate.

According to an embodiment of a formulation according to the invention, the water repellent according to the invention is a mixture of about 2% of a polymethylsiloxane resin solution with 70% of active ingredient in a solvent-based phase or 44 to 50% in an aqueous phase, preferably in an aqueous phase, and about 12% of polymethylsiloxane resin in an aqueous or solvent-based emulsion, preferably in an aqueous emulsion.

Advantageously, the silicone resin-based water repellent is a polymethylsiloxane resin in a nonionic aqueous emulsion. Preferably, the polymethylsiloxane resin contains 40% by weight of dry extract and thus comprises about 60% of water.

According to another embodiment of a formulation according to the invention, the water repellent is a polyurethane resin, preferably in an aqueous emulsion, and even more preferably at 50% by weight of dry extract and thus about 50% of water or also 35% by weight of dry extract, alone or in combination, with an acrylic styrene copolymer resin and/or a silicone resin, preferably in an aqueous emulsion, for example at 40% by weight of dry extract.

According to another embodiment of a formulation according to the invention, the water repellent is even more preferably an acrylic styrene copolymer resin, taken alone.

Such a water repellent, which is hydrophobic and contains a polyurethane and/or acrylic styrene copolymer resin used according to the invention, is therefore selected so as to promote adhesion between the substrate, possibly coated with a tie primer or an anticorrosion layer, and the antifouling coating layer and also between the different layers of antifouling coating, and also to increase water resistance.

The formulation according to the invention also comprises at least 5% by weight, of dry extract relative to the total weight, of an active anti-adhesion agent.

The amount of active anti-adhesion agent is advantageously considered to be in an aqueous or solvent-based phase, preferably in an aqueous phase. The formulation according to the invention thus comprises at least about 5% by weight of dry extract of active anti-adhesion agent relative to the total weight. The formulation may comprise about 10%, 15% or 20% of dry extract of active anti-adhesion agent relative to the total weight.

The active anti-adhesion agent according to the invention is selected from fatty compounds such as waxes, fats or paraffins, whether natural or synthetic, having a dropping point of between 30° and 100° C.

The active anti-adhesion agent according to the invention can be in solid form, for example in the form of a powder or pellets, viscous or liquid, preferably as an aqueous dispersion or emulsion.

Such an aqueous dispersion or emulsion of an active anti-adhesion agent can dissolve the active anti-adhesion agent and prevent phase shift phenomena from occurring in the formulation according to the invention.

Non-limiting examples of waxes include carnauba wax, of plant origin, which has a melting point of between 78° and 85° C., one of the highest among natural waxes, and a very high hardness, and beeswax, which has a melting point of 64° C.

A non-limiting example of fat includes lanolin, of animal origin, obtained by purification and refining of suint.

Preferably, the active anti-adhesion agent according to the invention is a paraffin, more preferably a 56/58 paraffin, i.e. having a dropping point of about 56-58° C.

According to an embodiment of the invention, the formulation comprises about 20% by weight of dry extract of active anti-adhesion agent and about 40% when in a 50% aqueous emulsion.

It is difficult to obtain a homogeneous, single-phase mixture in the presence of a large amount, for example at least 5% of dry extract, of a hydrophobic and oleophobic agent such as paraffin, for example 15% of paraffin, alone or in combination, with at least 10% of a water repellent selected from a silicone resin, a polyurethane resin and/or an acrylic styrene copolymer resin, alone or in combination. In addition, paraffin as an anti adhesion agent is known for its problems of low cohesion between the successively deposited layers, and requires the use of specific additives in order to overcome this problem. It is also difficult to cause a fatty substance, such as paraffin, to adhere to a substrate. Also the solvent-cosolvent combination used in the formulation according to the invention, which predominantly comprises water, allows a homogeneous, single-phase formulation to be obtained. The formulation according to the invention is thus homogeneous, single-phase, before and after application, and stable over time. Indeed, this aqueous solvent-cosolvent system dilutes and solubilizes hydrophobic compounds so that, after stirring, one or more homogeneous layers can be applied to the surface of the substrate to be treated, which is adapted to be submerged. The antifouling coating thus obtained after application forms a solid, homogeneous, single-phase layer.

According to an embodiment of the invention, the use of a low non-aqueous cosolvent content, below 5% by weight relative to the total weight, such as N-methylpyrrolidone, alone or in combination with ethanol, results in a single-phase, perfectly homogeneous mixture with the water repellent and the active anti-adhesion agent, which is stable, without any phase shift phenomenon over time. N-methylpyrrolidone, which is a coalescing agent, can also assist in the formation of due antifouling coating film, and ethanol, helps by reducing the drying time.

Advantageously, the formulation according to the invention has a flash point of more than 55° C., in particular as a result of the selection of a suitable solvent-cosolvent system which essentially comprises water, and of a cosolvent comprising rapeseed methyl ester, a mixture of methyl oleate and linoleate, or of a mixture of a C8 to C10 naphtha and a dearomatized aliphatic hydrocarbon, or also of a solvent-cosolvent essentially comprising water, for example at least 80% by weight relative to the weight of the solvent-cosolvent system, and possibly a small amount of N-methyl pyrrolidone, below 5%, alone or in combination. The formulation is thus considered to be non-flammable.

The non-flammable and nontoxic formulation according to the invention offers advantages in terms of transportation safety, storage and use, requiring no specific precautions.

Advantageously, the formulation according to the invention also comprises a natural non-toxic repellent, adapted to inhibit, attachment, in particular of algae, and other marine organisms and crustaceans, to the submerged surface to be protected.

Non-limiting examples of repellent include essential oils, for example, menthol, camphor, tea tree, geranium, thyme, bay leaf, pepper oil, or also grapefruit seed extracts.

Advantageously, the natural non-toxic agent, which is adapted to inhibit attachment, in particular of algae, is composed of bacterial strains at a concentration of less than 5% by weight relative to the total weight, preferably between 0.1 and 0.5%.

These include for example environmentally friendly algaecidal products. Such products are perfectly miscible in an aqueous solution, retain their properties in that they are not degraded by inadequate organic solvents, and help maintain a consistent formulation according to the invention before and after application.

The formulation according to the invention may also comprise the following constituents:

silica oxide and/or talc, which imparts hardness and distributes the active anti-adhesive agent within the dry film in addition to stabilizing it in the liquid antifouling coating;

a surfactant, adapted to prevent any phase shift and to allow miscibility between water and the various solvents and cosolvents, and in particular allowing silica, and/or talc and paraffin wax, to be dispersed, preferably a wetting polymeric coupling, nonionic agent of the hypophilic, hydrophilic, and water-soluble type, preferably ethoxylated octylphenol with about 11 moles of ethylene oxide or an agent containing a sodium acrylate polymer or an anionic surfactant;

a thickener, preferably a liquid polyurethane in an aqueous solution, or an acrylic thickener, which are rheological agents for rheology adjustment, for optimal paintbrush, brush or roller application;

an anticorrosion agent;

an antifoaming agent; and one or more organic, natural or synthetic dyes, or any organic or mineral (inorganic) pigment. Non-limiting examples of dyes include iron chromium hematite (brown), cobalt chromite green spinel (green), cobalt aluminate spinel (blue), copper chrome black spinel (black), titanium dioxide (white), which are insoluble in an aqueous phase.

The use of mineral, inorganic pigments, which are insoluble in an aqueous phase, advantageously provides opacity to the formulation to be applied, thereby changing the external appearance of the surface of the substrate to be treated.

The formulation according to the invention may optionally also include trace amounts of a biocide such as chloro-methyl-isothiazolin, an anti-mold preservative for the protection of the formulation during storage, for example in a can. By trace amounts is meant a concentration of less than or equal to 0.01%. Advantageously the formulation contains no trace amount of a biocide.

An example of a method for preparing an anti-fouling coating system according to the invention comprises the steps of:
  adding the wetting agent to the water while slowly stirring;
  if necessary, soaking the silicate oxide and/or talc powder with a repellent such as an essential oil, or a compound of bacterial strains;
  dissolving the silica oxide and/or talc powder, soaked, if necessary, within the liquid phase, while slowly stirring;
  thereafter, while still slowly stirring, adding the compounds to the thus obtained liquid phase in the following order: the water repellent selected from a polyurethane resin in an aqueous emulsion, a polymethylsiloxane resin, also in an aqueous emulsion and/or an acrylic styrene copolymer resin, alone or in admixture, followed by the paraffin wax, for example in an aqueous emulsion, and the non-aqueous cosolvent such as N-methylpyrrolidone, or a mixture of hydrocarbons;
  finally, adjusting rheology with one or more thickeners in order to obtain the desired appearance of the formulation, with a density of, for example, 1.01, and a viscosity, for example a Brookfield viscosity of 1.8 dPa·s at 23° C., or a cone/plate viscosity of 0.4 dPa·s at 25° C.

An alternative method for preparing an antifouling coating system according to the invention comprises the steps of:
  dissolving the anti-adhesive active agent, for example paraffin, in the solvents and cosolvents used according to the invention, rapeseed methyl ester, a mixture of methyl oleate and linoleate, excluding water. This dissolution is carried out with thorough stirring;
  then adding the compounds to the obtained liquid phase in the following order: a first portion of the water repellent, such as polymethylsiloxane resin solution at 70% of active material in a solvent phase, the thickener, the second portion of water repellent, for example polymethylsiloxane resin in an aqueous emulsion, the antifreeze agent, and then the biocide;
  thereafter, adding the surfactant, for example ethoxylated octylphenol;
  finally, adding water in order to obtain a single homogeneous phase, which is stable over time.

Depending on the desired tint of the antifouling coating according to the invention, it is also possible to add a dye in a final step, for example an inorganic pigment.

The mixing techniques and times are known to one skilled in the art, and are adapted to the amounts used.

The formulation according to the invention is advantageously in liquid form, in emulsion form or also in gel form. The formulation according to the invention is packaged in any container suitable for accommodating a liquid or a gel, such as a can.

When used, the formulation can advantageously be stirred before each application in order to obtain a perfectly homogeneous, single-phase mixture.

The formulation is preferably applied to smooth surfaces, even surfaces which are painted, for example with a and matrix antifouling paint or erodible matrix or semi-erodible matrix antifouling paint, or surfaces previously coated with an anticorrosive agent, and previously cleaned and dried surfaces.

The formulation as applied in at least one layer using an electric spray gun or a hand sprayer, a roller or a paintbrush, or also with a cloth, to the substrate to be protected against marine fouling.

Preferably, the formulation is applied by performing crossed, horizontal and vertical movements, so as to treat and moisten the substrate without reapplying the formulation to areas already treated.

Advantageously, the formulation is applied as a very thin layer.

For example, one liter is sufficient to treat about 8 to 10 m$^2$, or even 12 m$^2$ with a single layer, for example a layer of 7.7 m$^2$, or a layer with a wet thickness of about 120 μm, when applied using a brush, and 11.3 m$^2$, or a layer with a wet thickness of about 90 μm, when applied using a coating roller.

The formulation is preferably applied in a dry location, at an outside temperature of between about 5° and about 50° C., preferably between about 15° and 30° C. After application, the coating is allowed to dry at room temperature, for example 23° C., for about 25 minutes to about 40 minutes between 2 consecutive layers, and between about 30 minutes and about 50 minutes before submersion after the last layer has been applied.

The tools used in the application of the formulation according to the invention are then easily cleaned with water, and such cleaning does not induce any risk of pollution. The formulation according to the invention does not entail any risk of toxicity to the user and is easy to use, with the user requiring no special protection.

The formulation according to the invention, because of its water content of at least 30% by weight, relative to the total weight of the formulation, provides an antifouling coating that does not peal off when applied. Indeed, when used on substrates on which the organic solvents in the anti fouling coating compositions have not entirely dried out, moisture trapped between the substrate and the coating layer will inevitably lead to poor adhesion, delamination of the coating and attack and degradation of the substrate, as solvents evaporate faster than water during drying. However, the aqueous formulation according to the invention may be applied to a substrate which is not perfectly dry as a result of the evaporation, during drying, of water trapped under the coating, at the same time as the evaporation of water contained in the formulation. After applying a formulation according to the invention, a watertight antifouling coating is obtained, which does not reabsorb water when the treated substrate is submerged. Also, during drying, the active anti-adhesive agent becomes solid and forms an adhesive, homogeneous, solid and dry layer with the rest of the formulation. Thus, the anti-adhesive agent does not exude from the surface of the antifouling coating layer obtained according to the invention.

For example, a test performed by applying a layer of the formulation according to the invention with a 100 μm wet thickness on glass, after performing a measurement using a BK drying recorder at an adapted speed, showed that the solvents evaporated after 6 min, and revealed a surface drying time of the coating according to the invention of 1.0 mm, a bottom drying time of 39 min, and a time to total dryness of 47 min, under standard drying conditions at room temperature.

For optimum application of the formulation according to the invention, three layers are preferably applied when it is first used.

The lifetime of the treatment is twelve months in a marine environment, with long-term dry docking having no incidence on the treatment efficacy.

According to an alternative embodiment of the invention, the formulation contains no pigment or and does not change the color of the substrate after application.

The formulation according to the invention is resistant to abrasion. For example, a test carried out by applying a layer of the formulation according to Example 1 of the invention with a wet thickness of 150 μm on a tie primer with a thickness of 150 μm, and after accelerated drying for 58 hours under standard conditions, followed by 48 hours in a chamber at 40° C., after 200 friction cycles, showed an average loss in thickness of the antifouling coating film according to the invention of 16 μm. A second test carried out by applying a layer of the formulation according to Example 1 of the invention with a wet thickness of 150 μm on a tie primer, and after drying for three weeks under standard conditions, after 200 friction cycles, showed an average loss in thickness of the antifouling coating film according to the invention of 12 μm.

Advantageously, the treatment is repeated every year by applying two new layers of the formulation according to the invention.

The formulation according to the invention forms, after application, an antifouling coating layer intended to deter the attachment of marine organisms such as algae, shellfish and other crustaceans to the treated submerged substrates.

Indeed, the formulation renders the attachment surface very smooth and promotes their fast detachment either through simple cleaning, with no need to scrape or make any significant effort, or even more simply, for example, when the ship moves through the water.

Thus, for example, a ship which sails regularly will keep its hull clean through the mere friction of the water on the hull. A ship that does not sail regularly, thanks to the technical properties of the formulation, will clean itself when it sails and therefore will not require any specific tedious cleaning.

For example, a smooth hull which has thus been treated with the formulation according to the invention offers less resistance to forward motion, this treatment thereby reducing hydrodynamic drag, increasing speed and reducing fuel consumption. Indeed, 1 to 2 mm of algae and organisms attached to the hull produce a loss of about 15% in speed. Furthermore, the attached organisms deteriorate the surface of hulls, whether they are made of wood, metal or resin, and the formulation aims to protect these while reducing the frequency of cleaning.

Examples of the formulation in liquid or gel form according to the invention are given below:

EXAMPLE 1

Liquid Appearance

| | | |
|---|---|---|
| Acrylic-styrene copolymer resin | 15.21% | by weight of dry extract |
| Water | 35.59% | |
| C8 to C10 naphtha cosolvent | 22.76% | |
| Dearomatized aliphatic hydrocarbon cosolvent | 10.14% | |
| Paraffin | 7.08% | by weight of dry extract |
| Algaecide | 0.47% | |
| Talc | 6.07% | |
| Silica | 0.71% | |
| Anionic surfactant | 1.79% | |
| Thickener | 0.18% | |

EXAMPLE 2

Liquid Appearance

| | | |
|---|---|---|
| Polymethylsiloxane resin 40% in a non-ionic emulsion | 12.26%, or 4.9% | by weight of dry extract |
| Polyurethane resin 35% in aqueous emulsion | 18.62%, or 6.52% | by weight of dry extract |
| Acrylic-styrene copolymer resin 40% in an aqueous emulsion | 5.03% or 2.01% | by weight of dry extract |
| Water | 64.5% | |
| 50% paraffin in an aqueous emulsion, grade 56/58 | 39.88%, or 19.94% | by weight of dry extract |
| Essential oil (lavandin) | 0.32% | |
| Sodium acrylate polymer-based surfactant | 0.3% | |
| Silica oxide | 0.75% | |
| Polyurethane thickener | 0.34% | |
| Acrylic thickener | 0.42% | |

EXAMPLE 3

Liquid Appearance

| | | |
|---|---|---|
| Polymethylsiloxane resin 40% in a non-ionic emulsion | 14.38%, or 5.75% | by weight of dry extract |
| Polyurethane resin 50% in an aqueous emulsion | 24.22%, or 12.11% | by weight of dry extract |
| Water | 58.49% | |
| 50% paraffin in an aqueous emulsion, grade 56/58 | 37.66%, or 18.83% | by weight of dry extract |
| N-methyl pyrrolidone cosolvent | 1.94% | |
| Sodium acrylate polymer-based surfactant | 0.27% | |
| Silica oxide | 0.84% | |
| Polyurethane thickener | 1.27% | |
| Acrylic thickener | 0.51% | |

EXAMPLE 4

Gel Appearance

| | | |
|---|---|---|
| Polymethylsiloxane resin 40% in a non-ionic emulsion | 10.94%, or 4.38% | by weight of dry extract |
| Polyurethane resin 50% in an aqueous emulsion | 22.68%, or 11.34% | by weight of dry extract |
| Water | 56.39% | |

-continued

| | |
|---|---|
| 50% paraffin in an aqueous emulsion, grade 56/58 | 41.89%, or 20.95% by weight of dry extract |
| N-methyl pyrrolidone cosolvent | 1.81% |
| Ethanol cosolvent | 1.98% |
| Sodium acrylate polymer-based surfactant | 0.20% |
| Silica oxide | 0.64% |
| Acrylic thickener | 2.32% |

EXAMPLE 5

Liquid Appearance

| | |
|---|---|
| Polymethylsiloxane resin 40% in a non-ionic emulsion | 16.15%, or 6.46% by weight of dry extract |
| Polyurethane resin 50% in an aqueous emulsion | 27.20%, or 13.60% by weight of dry extract |
| Water | 59.52% |
| 50% paraffin in an aqueous emulsion, grade 56/58 | 30%, or 15% by weight of dry extract |
| N-methyl pyrrolidone cosolvent | 2.18% |
| Sodium acrylate polymer-based surfactant | 0.3% |
| Silica oxide | 0.95% |
| Polyurethane thickener | 1.42% |
| Acrylic thickener | 0.57% |

EXAMPLE 6

Liquid Appearance

| | |
|---|---|
| Polymethylsiloxane resin 40% in a non-ionic emulsion | 18.45%, or 7.38% by weight of dry extract |
| Polyurethane resin 50% in an aqueous emulsion | 31.07%, or 15.54% by weight of dry extract |
| Water | 60.88% |
| 50% paraffin in an aqueous emulsion, grade 56/58 | 20.02%, or 10.01% by weight of dry extract |
| N-methyl pyrrolidone cosolvent | 2.49% |
| Sodium acrylate polymer-based surfactant | 0.34% |
| Silica oxide | 1.08% |
| Polyurethane thickener | 1.63% |
| Acrylic thickener | 0.65% |

EXAMPLE 7

Liquid Appearance

| | |
|---|---|
| Polymethylsiloxane resin 40% in a non-ionic emulsion | 16.17%, or 6.47% by weight of dry extract |

-continued

| | |
|---|---|
| Polyurethane resin 50% in an aqueous emulsion | 27.24%, or 13.62% by weight of dry extract |
| Water | 54.71% |
| 50% Paraffin in an aqueous emulsion, grade 56/58 | 30.04%, or 15.02% by weight of dry extract |
| Ethanol of vegetal origin as cosolvent | 4.91% |
| N-methyl pyrrolidone cosolvent | 2.18% |
| Sodium acrylate polymer-based surfactant | 0.30% |
| Silica oxide | 0.80% |
| Polyurethane thickener | 1.42% |
| Acrylic thickener | 0.57% |

EXAMPLE 8

Liquid Appearance

| | |
|---|---|
| Polymethylsiloxane resin 40% in a non-ionic emulsion | 14.38%, or 5.75% by weight of dry extract |
| Polyurethane resin 50% in an aqueous emulsion | 24.22%, or 12.11% by weight of dry extract |
| Water | 54.12% |
| 50% Paraffin in an aqueous emulsion, grade 56/58 | 37.66%, or 18.83% by weight of dry extract |
| Ethanol cosolvent of vegetal origin | 4.36% |
| N-methyl pyrrolidone cosolvent | 1.94% |
| Sodium acrylate polymer-based surfactant | 0.27% |
| Silica oxide | 0.84% |
| Polyurethane thickener | 1.27% |
| Acrylic thickener | 0.51% |

EXAMPLE 9

Liquid Appearance

| | |
|---|---|
| Nappar 10 | 9% |
| Ethanol | 5% |
| Isopropanol | 10% |
| Monopropylene glycol | 5% |
| Ethoxylated octylphenol | 2% |
| Water | 30.99% |
| Polymethylsiloxane resin water repellent | 14% |
| Thickener | 4% |
| 56/58 paraffin | 20% |
| Biocide | 0.01% |

EXAMPLE 10

Liquid Appearance

| | |
|---|---|
| Rapeseed methyl ester | 24% |
| Monopropylene glycol | 5% |
| Ethoxylated octylphenol | 2% |
| Water | 30.99% |

| | |
|---|---|
| Polymethylsiloxane resin water repellent | 14% |
| Thickener | 4% |
| 56/58 Paraffin | 20% |
| Biocide | 0.01% |

EXAMPLE 11

Liquid Appearance

| | |
|---|---|
| Methyl linoleate | 15% |
| Primary butanol | 3% |
| Xylene | 6% |
| Monopropylene glycol | 5% |
| Ethoxylated octylphenol | 2% |
| Water | 30.99% |
| Polymethylsiloxane resin water repellent | 14% |
| Thickener | 4% |
| 56/58 Paraffin | 20% |
| Biocide | 0.01% |

EXAMPLE 12

Liquid Appearance

| | |
|---|---|
| Rapeseed methyl ester | 24% |
| Monopropylene glycol | 5% |
| Ethoxylated octylphenol | 2% |
| Water | 30.99% |
| Polymethylsiloxane resin water repellent | 19% |
| Thickener | 4% |
| 56/58 Paraffin | 15% |
| Biocide | 0.01% |

EXAMPLE 13

Liquid Appearance

| | |
|---|---|
| Methoxy propanol | 24% |
| Monopropylene glycol | 5% |
| Ethoxylated octylphenol | 2% |
| Water | 30.99% |
| Polymethylsiloxane resin water repellent | 19% |
| Thickener | 4% |
| 56/58 Paraffin | 15% |
| Biocide | 0.01% |

EXAMPLE 14

Liquid Appearance

| | |
|---|---|
| Xylene | 20% |
| Monopropylene glycol | 5% |
| Ethoxylated octylphenol | 2% |
| Water | 30.99% |
| Polysiloxane resin | 23% |
| Thickener | 4% |
| 56/58 Paraffin | 15% |
| Biocide | 0.01% |

The above formulation examples may advantageously comprise about 0.2% of a dye such as an inorganic pigment, for example iron chromium hematite (brown), cobalt chromite green spinel (green), cobalt aluminate spinel (blue), copper chrome black spinel (black), titanium dioxide (white).

In addition, the invention is illustrated by the effectiveness test described below, which was performed in the Camille Rayon harbor at Golfe-Juan (Alpes-Maritimes, France), a highly confined shallow water harbor with no water currents, and heavily loaded with silt.

The aim of this test is to demonstrate the efficacy of the formulation according to the invention as an antifouling agent for deterring the attachment of marine organisms such as algae, shellfish and other crustaceans onto any submerged substrate.

The test is performed with small plates (30 cm×20 cm) made of marine plywood, with both sides initially coated with a white epoxy primer layer, submerged to a depth of about 1.50 m.

Both formulations are thus tested comparatively after application of three consecutive layers with a brush:

plate A is coated with the formulation according to the invention as defined above in Example 9, which is aqueous, hydrophobic, super oleophobic, and clear; and plate B is coated with a copper salt-based antifouling paint, available from the INTERNATIONAL AKZO NOBEL group under the reference CRUISER UNO blue, this type of substance now being banned by the European REACH standard.

Figure 1A:
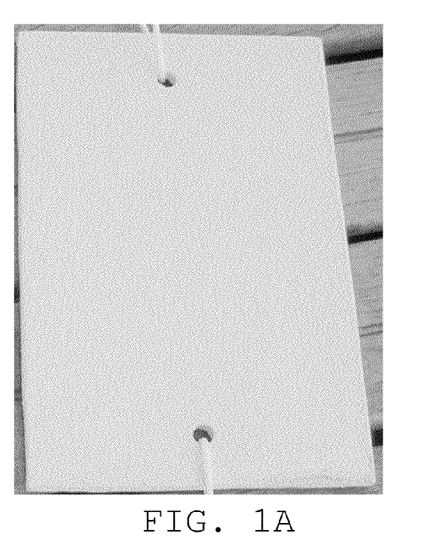
FIGS. 1A and 1B show the appearance of a plate A coated with an example of formulation according to the invention, and a plate B, coated with a copper salt-based antifouling paint, before submersion.
Figure 1B:
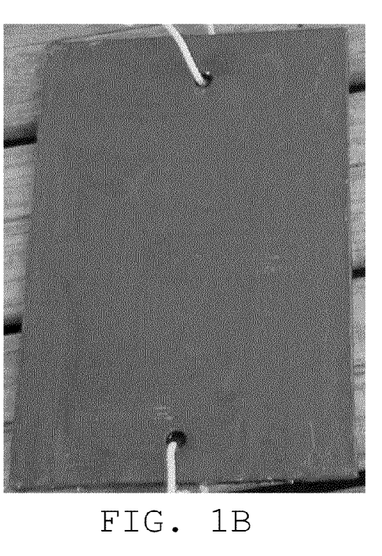
Figure 2A:
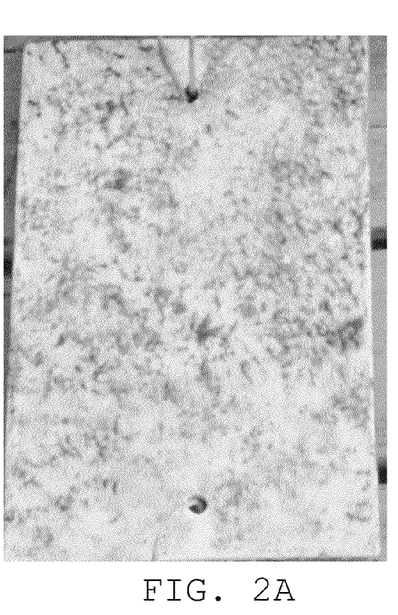
FIGS. 2A and 2B show the appearance of the same plates A and B, respectively, after they had been submerged in seawater for 64 days.
Figure 2B:
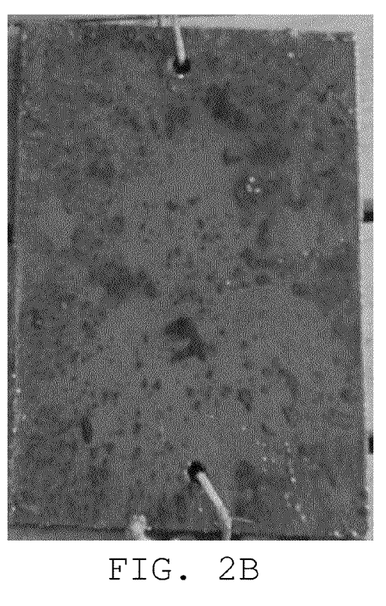

The plates were photographed as they were submerged on Oct. 1, 2008, as illustrated in FIGS. 1A and 1B, and then when they were taken out on Dec. 3, 2008, as illustrated in FIGS. 2A and 2B.

In this respect, FIGS. 1A and 1B show the appearance of plate A and plate B before submersion. Both plates A and B appear to be totally clean, devoid of any fouling and any other marine deposit.

FIGS. 2A and 2B show the appearance of the same plates A and B, respectively, after they had been submerged in seawater for 64 days.

As shown by the obtained results, plate A, to which three layers of the formulation according to the invention were applied, is coated with a slight silt deposit and is free of barnacle colonization.

Plate A, which was treated with the formulation of the invention, according to the test results, thus deters the attachment of marine organisms such as algae, shellfish and other crustaceans, and reduces deposits such as silt. The formulation according to the invention thus offers a new alternative anti-fouling coating, the efficacy of which is comparable to a biocide-based antifouling paint while at the same time improving environmental and human health protection.

Of course, the invention is not restricted to the embodiments and examples presented above and those skilled in the art, through routine operations, may implement any other embodiments not explicitly described herein, which fall within the broad scope of the present invention.

The invention claimed is:

1. A formulation of an antifouling coating system for application to submerged substrates, comprising:
   at least 30% by weight of water, relative to the total weight of the formulation,
   at least 10% by weight of dry extract, relative to the total weight of the formulation, of a water repellent which is a mixture of a silicone resin, a polyurethane resin and an acrylic-styrene copolymer resin, and
   at least 5% by weight of dry extract, relative to the total weight of the formulation, of an anti-adhesive active agent.

2. The formulation according to claim 1, wherein the silicon resin-based water repellent is a polysiloxane resin, and/or derivatives thereof, alone or in admixture.

3. The formulation according to claim 2, wherein the silicon resin-based water repellent is a polymethylsiloxane resin in a non-ionic aqueous emulsion.

4. The formulation according to claim 1, wherein the anti-adhesive active agent is a wax, a grease, or paraffin.

5. The formulation according to claim comprising at least 50% by weight, relative to the total weight, of an aqueous solvent-cosolvent system.

6. The formulation according to claim 5, comprising at least 20% by weight, relative to the total weight, of a cosolvent selected from hydrocarbons, alcohols, ketones, esters, alone or in combination.

7. The formulation according to claim 1, further comprising a non-toxic natural agent, adapted to inhibit attachment of algae and other marine organisms and crustaceans, wherein said non-toxic natural agent is composed of bacterial strains, at a concentration of less than 5% by weight relative to the total weight of the formulation.

8. The formulation according to claim 1, comprising:

| | |
|---|---|
| Polymethylsiloxane resin 40% in a non-ionic emulsion | 12.26%, or 4.9% by weight of dry extract |
| Polyurethane resin 35% in aqueous emulsion | 18.62%, or 6.52% by weight of dry extract |
| Acrylic-styrene copolymer resin 40% in an aqueous emulsion | 5.03% or 2.01% by weight of dry extract |
| Water | 64.5% |
| 50% paraffin in an aqueous emulsion, grade 56/58 | 39.88%, or 19.94% by weight of dry extract |
| Essential oil (lavandin) | 0.32% |
| Sodium acrylate polymer-based surfactant | 0.3% |
| Silica oxide | 0.75% |
| Polyurethane thickener | 0.34% |
| Acrylic thickener | 0.42% . |

9. The formulation according to claim 2, wherein the anti-adhesive active agent is a wax, a grease, or paraffin.

10. The formulation according to claim 2, comprising at least 50% by weight, relative to the total weight, of an aqueous solvent-cosolvent system.

11. The formulation according to claim 10, comprising at least 20% by weight, relative to the total weight, of a cosolvent selected from hydrocarbons, alcohols, ketones, esters, alone or in combination.

12. The formulation according to claim 3, comprising at least 50% by weight, relative to the total weight, of an aqueous solvent-cosolvent system.

13. The formulation according to claim 12, comprising at least 20% by weight, relative to the total weight, of a cosolvent selected from hydrocarbons, alcohols, ketones, esters, alone or in combination.

14. The formulation according to claim 9, comprising at least 50% by weight, relative to the total weight, of an aqueous solvent-cosolvent system.

15. The formulation according to claim 14, comprising at least 20% by weight, relative to the total weight, of a cosolvent selected from hydrocarbons, alcohols, ketones, esters, alone or in combination.

16. The formulation according to claim 2, further comprising a non-toxic natural agent, adapted to inhibit attachment of algae and other marine organisms and crustaceans, wherein said non-toxic natural agent is composed of bacterial strains, at a concentration of less than 5% by weight relative to the total weight of the formulation.

17. A method for treating substrates to be submerged into water/marine environment with a formulation according to claim 1, comprising applying the formulation in the form of at least one layer through spraying, a roller or a brush, to the substrate to be protected against marine fouling, after prior cleaning and drying of the substrate, at an outside temperature of between about 5° and about 50° C., and then drying at room temperature for about 25 minutes to about 40 minutes between two consecutive layers, and between about 30 minutes and about 50 minutes before submersion.

18. Method of deterring the attachment of marine organisms such as algae, shellfish and other crustaceans onto any a submerged substrate, comprising applying the formulation according to claim 1 to the substrate as an antifouling agent.

19. The method according to claim 18, wherein the substrate is a ship hull.

20. The method according to claim 17, wherein the outside temperature is between about 5° and about 50° C.

21. The method according to claim 17, wherein the drying is at a temperature of about 23° C.

* * * * *